Aug. 15, 1950     L. E. LEGNER     2,519,257
FISHING LINE WAXER
Filed Aug. 4, 1945
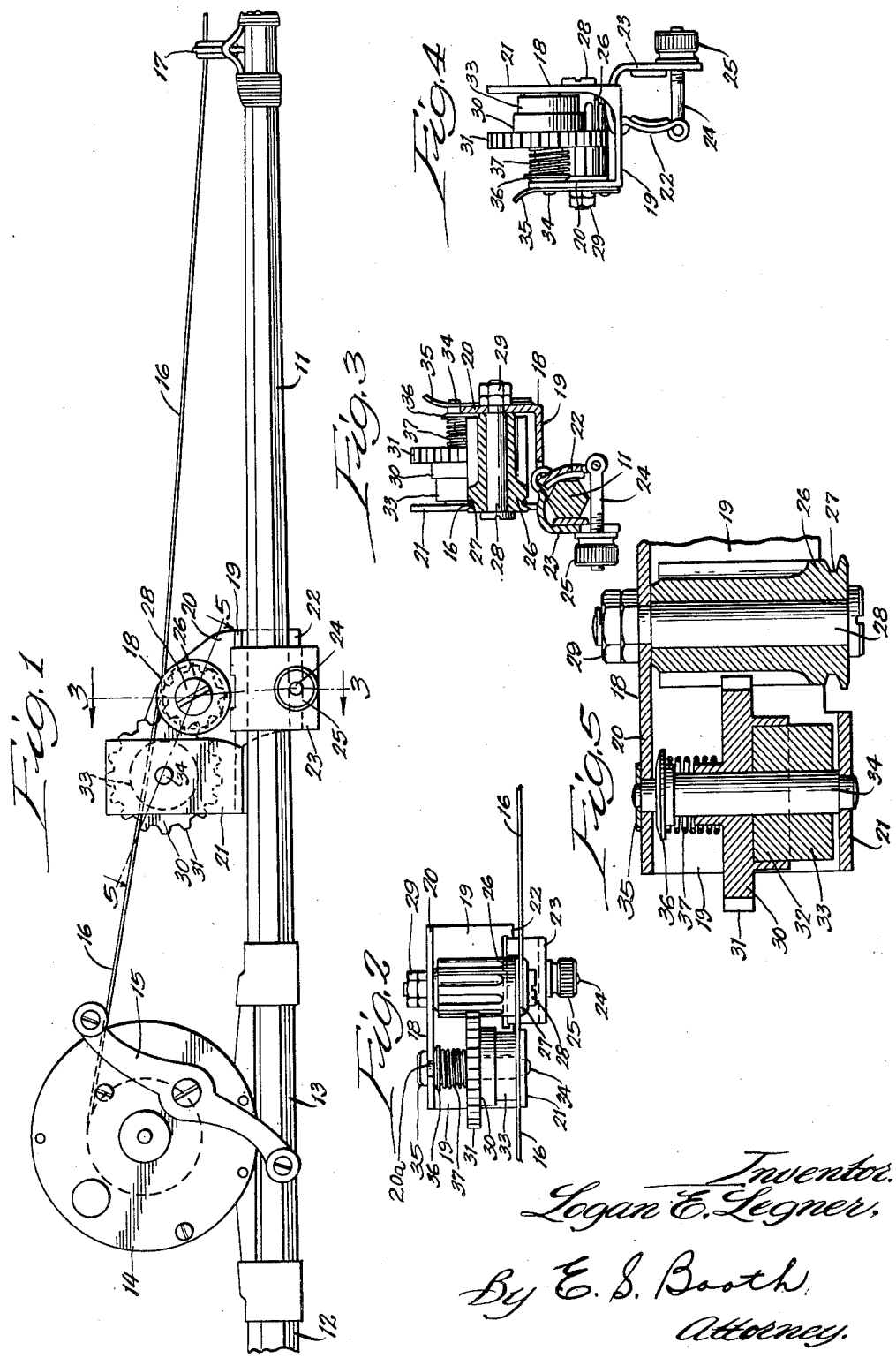
Inventor.
Logan E. Legner,
By E. S. Booth
Attorney.

Patented Aug. 15, 1950

2,519,257

UNITED STATES PATENT OFFICE 2,519,257

FISHING LINE WAXER

Logan E. Legner, Forest Park, Ill.

Application August 4, 1945, Serial No. 608,931

6 Claims. (Cl. 43—25)

This invention relates to fishing equipment and particularly to devices for waxing fishing lines.

The object of this invention is to provide a mechanical device which can be removably clamped to a fishing rod in such position that the fishing line can be run through the waxer by operation of the reel or by drawing the line against the drag of the reel.

A further object of the invention is to provide a fishing line waxer which will apply a thin and even coat of wax to a fishing line.

A further object of the invention is to provide a device of this type which can be readily reloaded with additional blocks of wax as required.

A further object of the invention is to provide a device of this character which can be readily assembled and disassembled and can be easily attached to or removed from a fishing rod.

Other objects and advantages will appear from the following description when read in connection with the accompanying drawings, in which—

Figure 1 is a side elevation of a fragment of a fishing rod upon which the fishing line waxer of this invention is mounted;

Figure 2 is a plan view of the fishing line waxer;

Figure 3 is a sectional elevation of the fishing line waxer taken on the line 3—3 of Figure 1;

Figure 4 is a rear elevation of the waxer; and

Figure 5 is a section of the fishing line waxer taken on the line 5—5 in Figure 1.

Referring to the drawings, the fishing rod is indicated by numeral 11. Only fragments of it and the handle 12 are shown. Adjacent the handle is the reel mounting 13 upon which a conventional reel 14 with crank 15 is mounted. The line is indicated by the numeral 16 and runs from the reel through the ferrule 17.

The waxer of this invention is indicated by the numeral 18. In the preferred embodiment shown, it is constructed of a frame bent into a base plate 19 with wall plates 20 and 21 rising therefrom.

Also bent from the frame member is the mounting flange 22 by which the waxer is secured to the fishing rod 11 by means of the mounting clamp 23, the pivoted bolt 24 and the nut 25 by which the mounting flange and clamp are forced together. The flange and clamp may be lined with felt, if desired, to protect the rod. As indicated, the clamp is so formed that it pivots upon the mounting flange and is thus readily adapted to secure the waxer upon rods of different section and different thickness.

Mounted for rotation upon the frame are the toothed pulley 26 and the wheel 30 which are drivably connected with each other to rotate in opposite directions in the operation of the waxer. The toothed pulley 26 has a groove 27 to receive the line 16 and is toothed throughout a large part of its length so that as the teeth 31 on the waxing wheel 30 are axially displaced in the operation of the waxer, the engagement of the toothed pulley and waxing wheel will be assured.

The toothed pulley 26 is mounted rotatably upon the stud 28 which is secured to the frame plate 20 by the nuts 29.

Waxing wheel 30 is provided with a pocket or recess 32 to receive the block of wax 33. While in the preferred embodiment this pocket 32 is shown circular in form and the block of wax is cylindrical, these forms may be readily altered without affecting the principle of the invention. The block of wax is intended to be replaceable as it is worn out.

The waxing wheel is rotatably mounted upon the bolt 34 which has one end borne by the plate 21 and the other can be dropped into a slot 20a in the wall plate 20 where it is held by means of the retainer spring 35.

Between the waxing wheel 30 and the frame plate 20 are the washer 36 and the coil spring 37 for which the washer 36 serves as an abutment.

Method of operation

The waxer is mounted upon a fishing rod 11 by dropping the bolt 24 from the mounting clamp 23 which readily permits the insertion of the rod. Thereupon the bolt is swung back into position and the nut 25 tightened until the rod is firmly gripped between the mounting flange 22 and the clamp 23. The waxer is mounted preferably adjacent the reel and between it and the ferrule 17.

Thereupon the line 16 can be dropped between the wax block 33 and the frame plate 21 and then threaded over the toothed pulley groove 27 and drawn against the drag of the reel.

As the line 16 is drawn through the waxer, the pulley 26 causes the waxing wheel 30 to rotate so that the face of the block presented to the passing line is constantly changing and evenly worn down. The line 16 in its passage against the block 33 receives a thin application of the wax from the block and as the entire length of the line is drawn through the waxer, the line is coated throughout its length with a fairly uniform application of wax. The passage of the line over the pulley 27 further distributes any wax that is applied and improves the coating.

After the line has been manually drawn through the waxer against the drag of the reel 14, the line may be left threaded upon the device and the reel then operated by the crank 15 in the familiar way to rewind the line upon the reel. If this is done with the line threaded through the waxer, a further application of wax is applied to the line, and when the operation is completed, the line is wound upon the reel and ready for use.

The coil spring 37 gently presses the waxing wheel 30 so that the wax block 33 is in firm contact with the line passing between the block 33 and the wall plate 21. As the wax block 33 is worn down, the spring 37 moves the waxing wheel 30 toward the wall plate 21 without affecting the engagement of the wheel with the pulley pinion. When the block is completely worn down, it may be replaced by pressing the retainer spring 35 to release the shaft 34 and lifting the entire assembly of the block 33, wheel 30, washer 36 and spring 37 from the frame. The waxing wheel 30 is thus exposed and the old wax block fragment can be removed and replaced by a new wax block. The device can then be readily reassembled for use with the new block.

While one embodiment of the invention has been shown and described in detail, it will be understood that this is illustrative only and is not to be taken as a definition of the scope of the invention, reference being had for this purpose to the appended claims.

I claim:

1. A line waxer for applying wax to a line passing therethrough comprising a frame, a toothed wheel thereon, a waxing block carried by the wheel and adapted to receive the line between the waxing block and the frame, means for biasing the waxing block against the frame, and a rotatable toothed pulley engaging and driving the toothed waxing wheel and driven by the line drawn through the waxer.

2. A line waxer for applying wax to a line comprising a frame, a toothed wheel mounted to rotate and axially movable thereon, a waxing block carried by the wheel and adapted to receive the line between the waxing block and the frame, a rotatable toothed pulley mounted on the frame to engage and drive the toothed waxing wheel and driven by the line drawn through the waxer, and a spring mounted adjacent the toothed wheel to move the waxing block axially toward the frame as the wax is consumed.

3. A fishing line waxer mountable on a fishing rod for applying wax to a line comprising a frame, a wheel rotatable thereon, a waxing block carried by the wheel and adapted to receive the line between the waxing block and the frame, a rotatable pulley driving the waxing wheel and driven by the line drawn through the waxer, a mounting flange on the frame, and an adjustable clamp pivoted to the frame and cooperating with the mounting flange to secure the waxer to a fishing rod.

4. A fishing line waxer mountable on a fishing rod for applying wax to a line comprising a frame, a toothed wheel mounted to rotate and axially movable thereon, a waxing block carried by the wheel and adapted to receive the line between the waxing block and the frame, a rotatable toothed pulley mounted on the frame to engage and drive the toothed wheel and driven by the line drawn through the waxer, a spring mounted adjacent the toothed wheel to move the waxing block axially toward the frame as the wax is consumed, a mounting flange on the frame, and an adjustable clamp pivoted to the frame and cooperating with the mounting flange to secure the waxer to a fishing rod.

5. A line waxer for applying wax to a line comprising a frame having a fixed wall plate, a wheel rotatable on the frame on an axis at right angles to the wall plate, a waxing block carried by and rotatable with the wheel and lying adjacent to the wall plate to receive the line between the waxing block and the wall plate, means for biasing the waxing block toward the wall plate, and a rotatable pulley driven by a line drawn through the waxer and drivably connected to the wheel for turning the wheel and waxing block.

6. A line waxer for applying wax to a line comprising a frame having a fixed wall plate, a waxing block movably mounted on the frame adjacent to the wall plate and adapted to receive the line between the waxing block and the wall plate, means for biasing the waxing block toward the wall plate, and a rotatable pulley driven by a line drawn through the waxer and drivably connected to the waxing block for moving the waxing block relative to the frame.

LOGAN E. LEGNER.

REFERENCES CITED

The following references are of record in the file of this patent:

UNITED STATES PATENTS

| Number | Name | Date |
| --- | --- | --- |
| 1,689,730 | Knight | Oct. 30, 1928 |
| 1,877,663 | Hoffmann | Sept. 13, 1932 |
| 2,193,836 | Bashore | Mar. 12, 1940 |
| 2,235,229 | Lytton | Mar. 18, 1941 |

FOREIGN PATENTS

| Number | Country | Date |
| --- | --- | --- |
| 3,910 | Austria | Dec. 15, 1900 |